(12) United States Patent
Williams

(10) Patent No.: US 9,004,022 B2
(45) Date of Patent: Apr. 14, 2015

(54) ENGINE INCLUDING A CRANKSHAFT

(75) Inventor: Rick L. Williams, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 13/572,490

(22) Filed: Aug. 10, 2012

(65) Prior Publication Data
US 2014/0041618 A1    Feb. 13, 2014

(51) Int. Cl.
| F02B 25/08 | (2006.01) |
| F02B 75/32 | (2006.01) |
| F02B 75/26 | (2006.01) |
| F16C 3/10  | (2006.01) |
| F16C 3/20  | (2006.01) |

(52) U.S. Cl.
CPC .... F16C 3/10 (2013.01); F16C 3/20 (2013.01)

(58) Field of Classification Search
USPC ........ 123/195 R, 51 AA, 51 AB, 45 A, 197.4
See application file for complete search history.

(56) References Cited

U.S. PATENT DOCUMENTS

| 4,876,992 | A  | * | 10/1989 | Sobotowski ................ 123/48 R |
| 5,934,424 | A  |   | 8/1999  | Hosek et al. |
| 6,314,643 | B1 | * | 11/2001 | Leith .......................... 29/888.08 |
| 6,536,399 | B2 |   | 3/2003  | Matsuda et al. |
| 6,880,513 | B1 |   | 4/2005  | Komatsu et al. |
| 7,237,958 | B2 | * | 7/2007  | Giberson ...................... 384/428 |
| 7,350,498 | B2 | * | 4/2008  | Matsuda ................... 123/196 R |
| 2005/0061291 | A1 | * | 3/2005 | Nishimura et al. ........ 123/197.4 |
| 2005/0115524 | A1 |   | 6/2005 | Sanada et al. |
| 2007/0131192 | A1 | * | 6/2007 | Hochmayr et al. .... 123/195 HC |
| 2008/0257296 | A1 | * | 10/2008 | Nishi et al. ................ 123/192.2 |
| 2009/0255503 | A1 |   | 10/2009 | Fujiwara |
| 2010/0126458 | A1 |   | 5/2010 | Kondo |
| 2011/0031058 | A1 |   | 2/2011 | Klotz et al. |

FOREIGN PATENT DOCUMENTS

DE    19643705 A1    7/1997

OTHER PUBLICATIONS

Williams, Rick L., "Engine Crankshaft," U.S. Appl. No. 13/572,453, filed Aug. 10, 2012, 35 pages.

* cited by examiner

*Primary Examiner* — Lindsay Low
*Assistant Examiner* — Syed O Hasan
(74) *Attorney, Agent, or Firm* — James Dottavio; Alleman Hall McCoy Russell & Tuttle LLP

(57) ABSTRACT

An inline engine is provided. The engine includes a cylinder block with four cylinders and only three main bearing saddles. The engine also includes a crankshaft with only three main bearing journals. The engine may exhibit less friction than other similar engines.

17 Claims, 6 Drawing Sheets

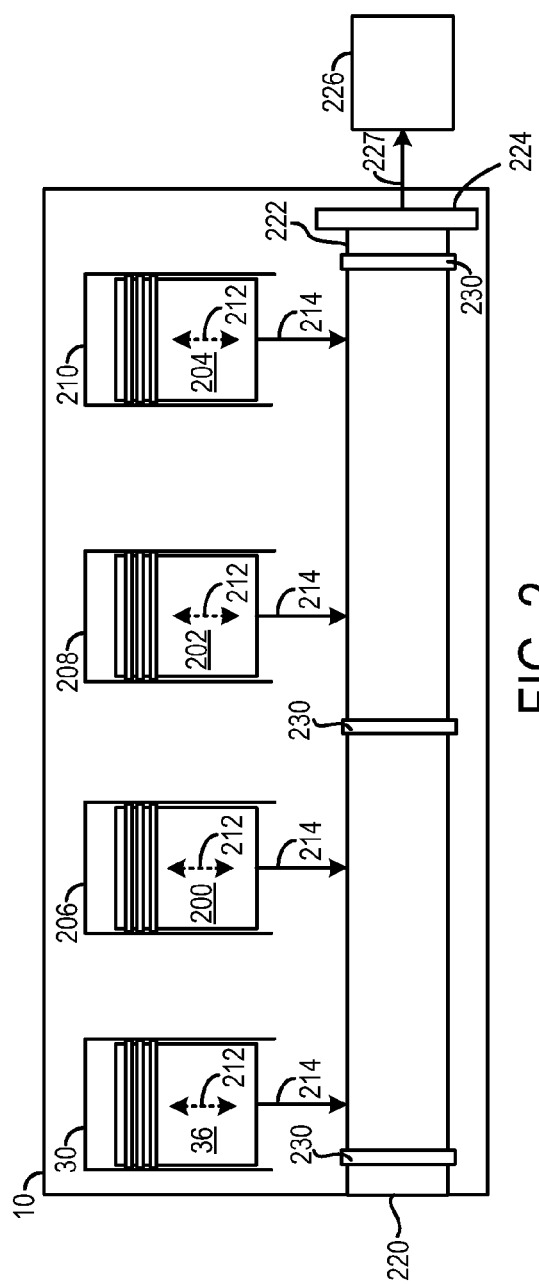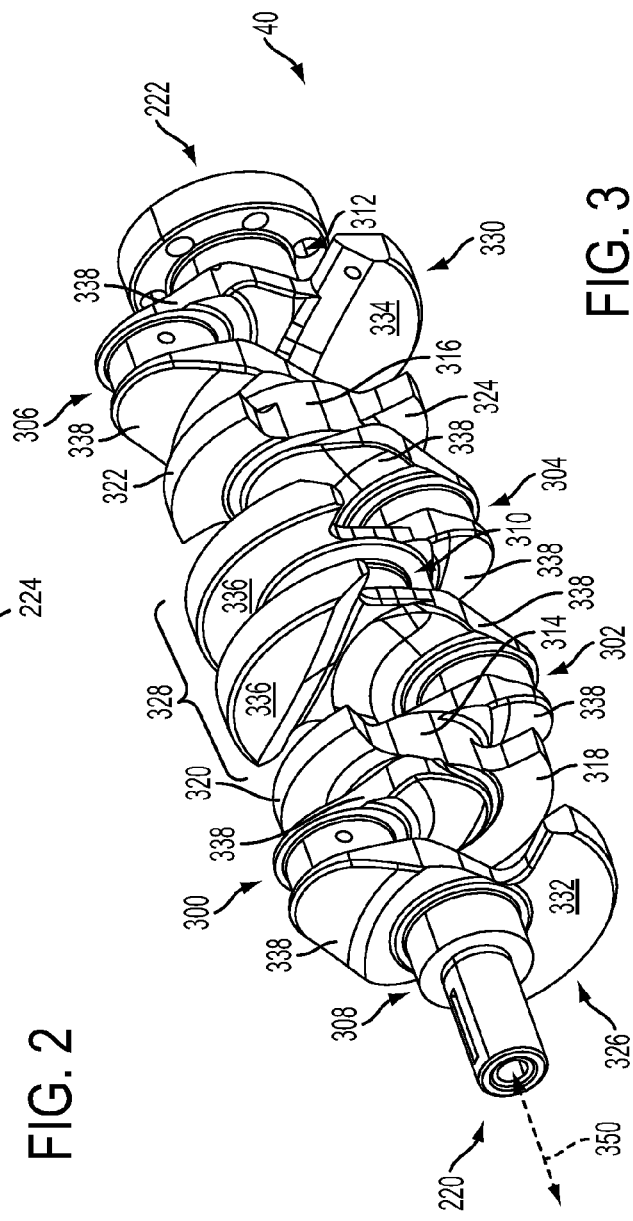

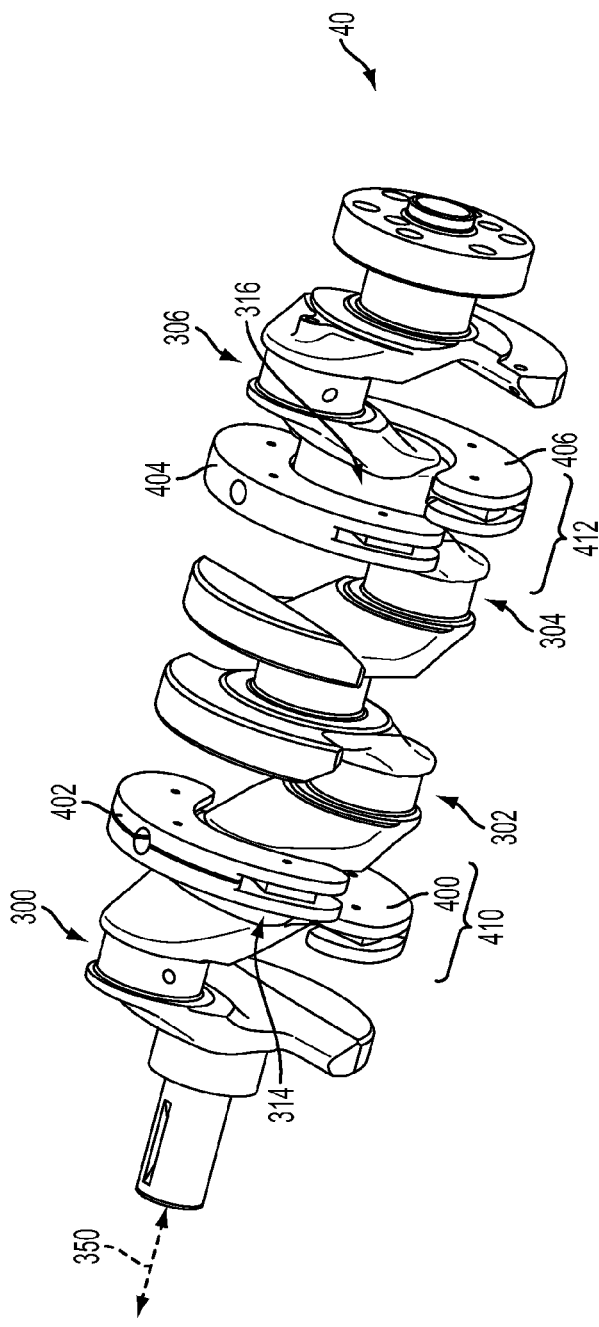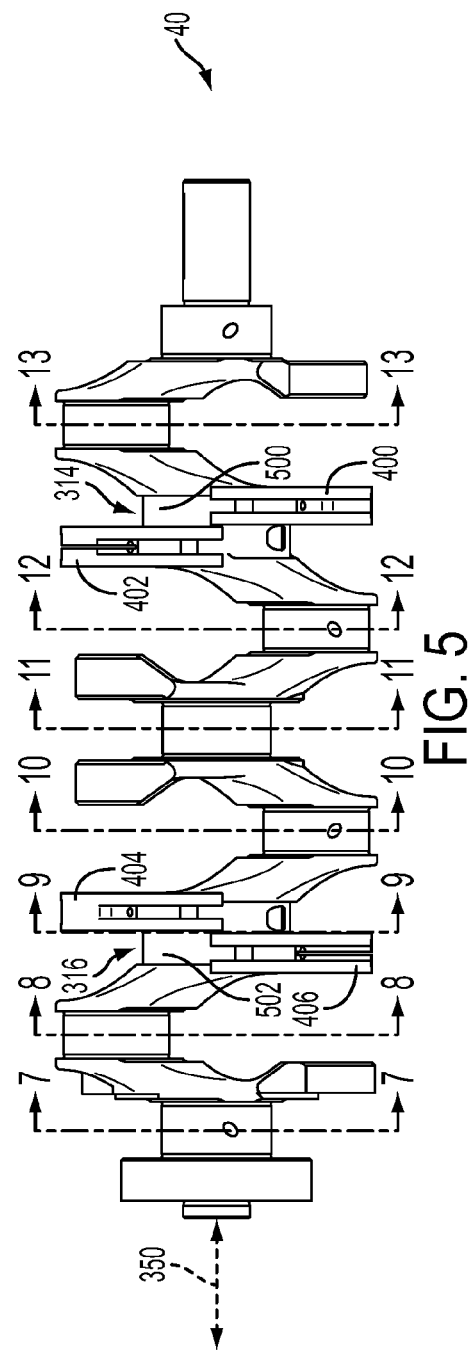

ENGINE INCLUDING A CRANKSHAFT

BACKGROUND/SUMMARY

A vehicle drivetrain transfers motive power from a power source to vehicle wheels. An engine is one example of a power source that includes a crankshaft. The crankshaft converts combustion energy from engine cylinders into rotational energy. In particular, combustion energy is transferred from the engine cylinders to pistons that linearly reciprocate. The pistons transfer the combustion energy to a crankshaft via rods, and the crankshaft converts the linear motion into rotational motion. The crankshaft may also include main bearing journals that are in mechanical communication with crankshaft bearings. The crankshaft bearings are captured between an engine block and the crankshaft. Lubrication flows from the engine block to the bearings, and the engine block supports the bearings and the crankshaft. The engine block and bearings allow the crankshaft and main bearing journals to rotate within the bearings. One example crankshaft is disclosed in U.S. Patent Publication No. 2005/0115524 which shows a four cylinder engine having five main bearings rotatably coupled to a crankshaft in the engine. The bearings guide crankshaft rotation and are mechanically coupled to an engine block that supports the crankshaft and bearings.

A crankshaft may flex as torque is input to the crankshaft via connecting rods. Crankshaft flex may limit engine speed and increase engine vibration. One way to reduce crankshaft flexing is to provide a large number of main bearing journals along the length of a crankshaft so that the crankshaft can be supported at many locations. However, engine friction losses are proportional to a number of crankshaft bearing journals. Therefore, engine friction losses increase for each crankshaft bearing journal that is added to a crankshaft. As a result, the engine's power output and fuel economy may be substantially decreased as the number of bearing journals increase. Moreover, engine weight is increased for every additional crankshaft bearing journal. Consequently, engine block cost increases as a number of crankshaft main bearing journals increases.

To address at least some of the aforementioned issues an inline four cylinder engine, comprising: a crankshaft including two outer main bearing journals and a sole inner main bearing journal axially positioned between the two outer main bearing journals is provided. Thus, an inline four cylinder engine including only three main bearings is provided.

By limiting a number of main bearings of an inline four cylinder engine to three rather than the customary five, it may be possible to reduce engine friction and improve vehicle fuel economy. In one example, the engine includes three main bearing saddles with bearings that guide and support a crankshaft with three main bearing journals. A first bearing journal is positioned at a front side of the crankshaft, a second bearing journal is positioned at a rear side of the crankshaft, and a third bearing journal is positioned near a middle of the crankshaft. In this way, the crankshaft may be sufficiently supported while engine friction is reduced.

The engine and crankshaft described herein may reduce engine fuel consumption. Further, the engine and crankshaft may vibrate and/or flex less than other designs. Further still, the engine and crankshaft may operate efficiently at higher engine speeds.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 2 shows another schematic depiction of the internal combustion engine and crankshaft shown in FIG. 1;

FIG. 3 shows a first example of the crankshaft shown in FIG. 2;

FIG. 4 shows a second example of the crankshaft shown in FIG. 2;

FIG. 5 shows a side view of the second example crankshaft shown in FIG. 4;

FIGS. 2-14 are drawn approximately to scale. However, other relative dimensions may be used if desired.

DETAILED DESCRIPTION

Figure 1:
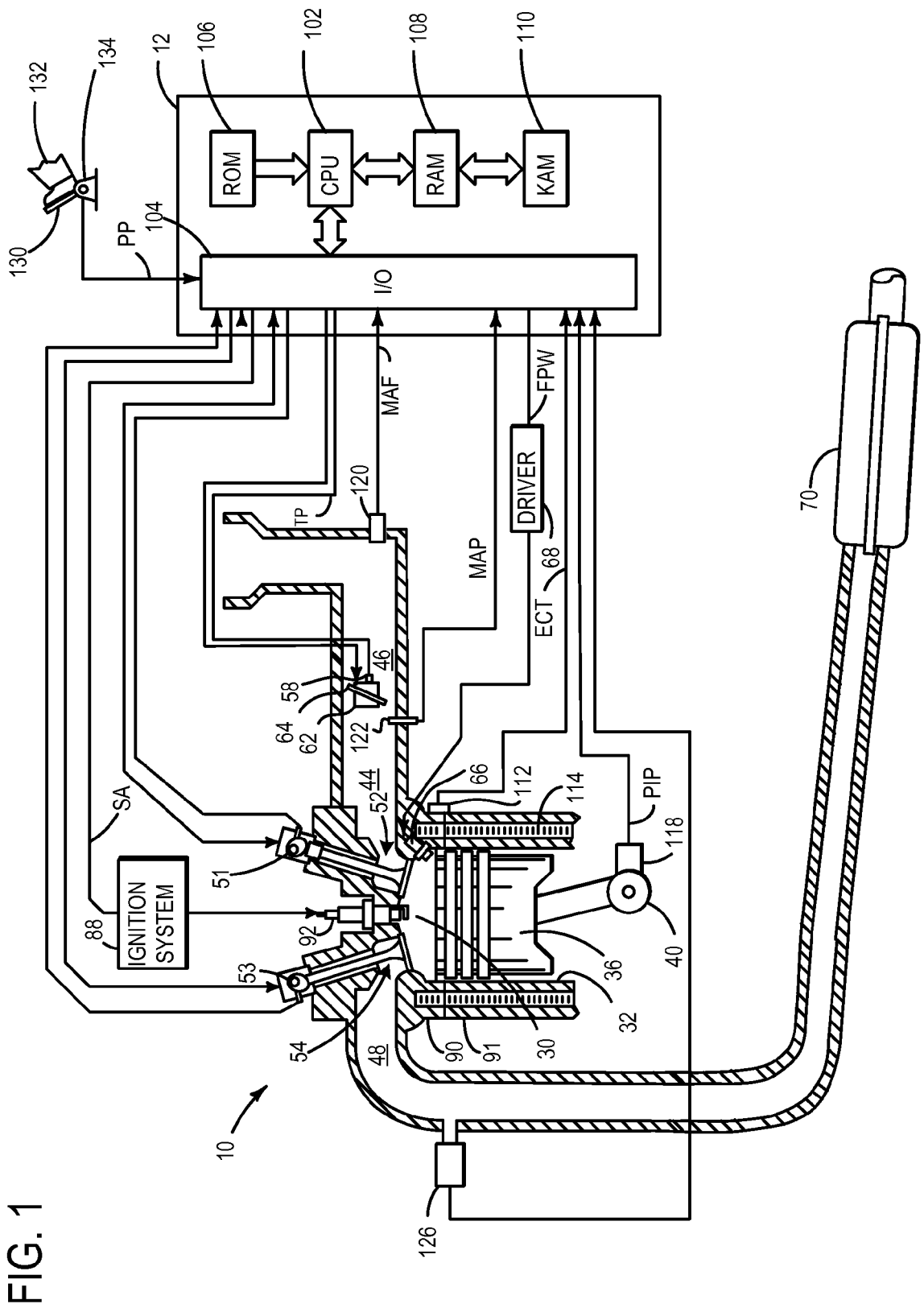
FIG. 1 shows a schematic depiction of an internal combustion engine including a crankshaft.
Figure 14:
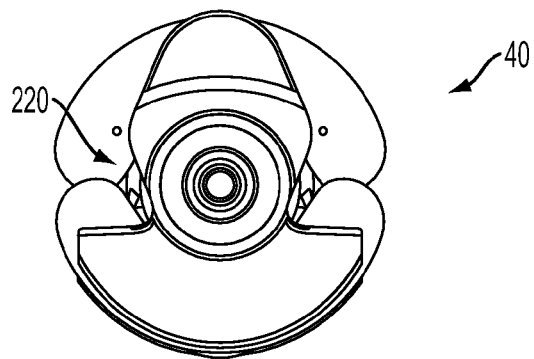
FIG. 14 shows the front end of the crankshaft shown in FIG. 4.
Figure 15:
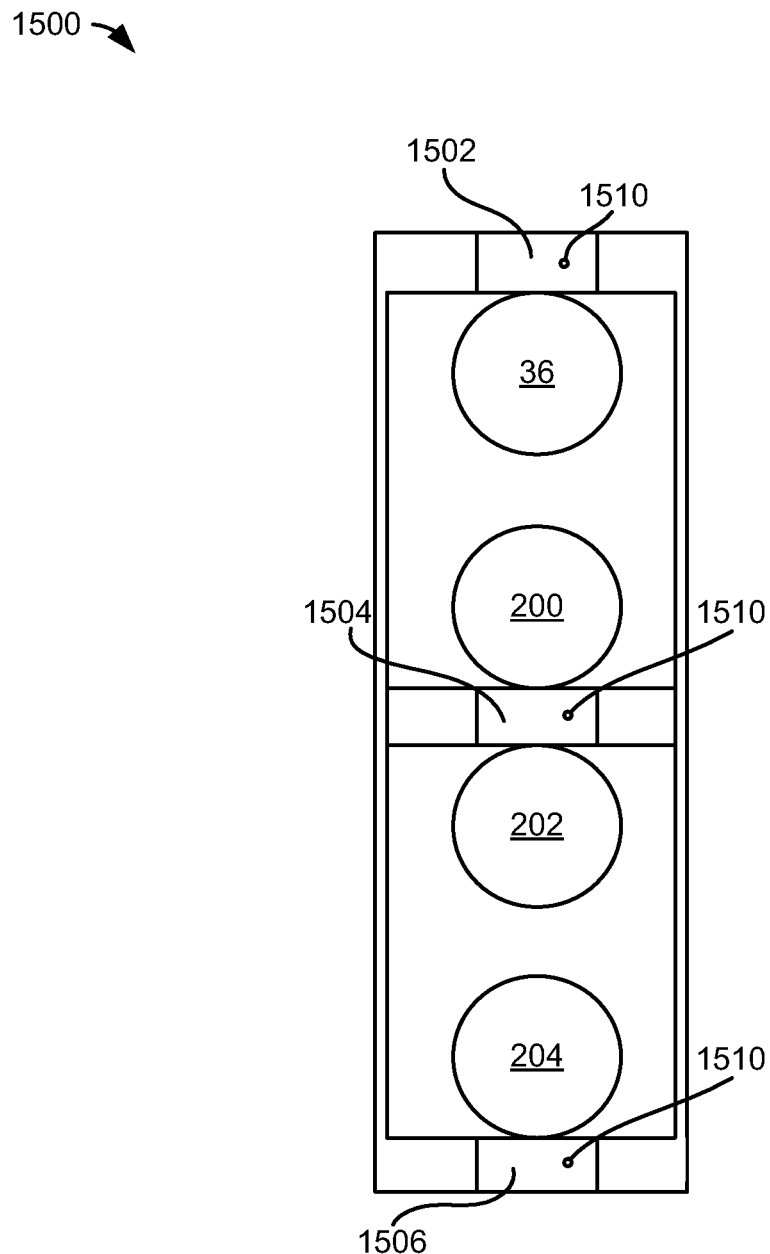
FIG. 15 shows a cylinder block that may support the crankshaft of FIGS. 1-14.

The present description relates to a crankshaft for an internal combustion engine. The crankshaft may be provided in an engine system as shown in FIGS. 1 and 2. Perspective and side views of one example crankshaft are shown in FIGS. 3-5. Cut-away and end views of the example crankshaft are provided in FIGS. 6-14. Finally, FIG. 15 shows an example cylinder block to which the example crankshaft may be mechanically coupled.

Referring to FIG. 1, internal combustion engine 10, comprising a plurality of cylinders, one cylinder of which is shown in FIG. 1, is controlled by electronic engine controller 12. The engine may be included in vehicle. Engine 10 includes cylinder 30 and cylinder walls 32 with piston 36 positioned therein and connected to a crankshaft 40.

The engine 10 also includes a cylinder head 90 coupled to a cylinder block 91 to form the cylinder 30. Therefore, the cylinder block 91 forms a portion of the cylinder 30. Cylinder 30 is shown communicating with intake manifold 44 and exhaust manifold 48 via respective intake valve 52 and exhaust valve 54. Each intake and exhaust valve may be operated by an intake cam 51 and an exhaust cam 53. In this way, the valves may be cyclically actuated to perform combustion in the cylinder 30. However, in other examples electromagnetic valve actuation may be utilized.

Fuel injector 66 is shown positioned to inject fuel directly into cylinder 30, which is known to those skilled in the art as direct injection. Additionally or alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake chamber 46. In other examples, the engine 10 may include a turbocharger having a compressor positioned in the induction system and a turbine positioned in the exhaust system. The turbine may be coupled to the compressor via a shaft. A high pressure, dual stage, fuel system may be used to generate higher fuel pressures at injector 66.

Distributorless ignition system 88 provides an ignition spark to cylinder 30 via spark plug 92 in response to controller 12. However, in other examples the ignition system 88 may not be included in the engine 10 and/or compression ignition may be utilized. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

A converter 70 or other suitable emission control device may be positioned downstream of the exhaust manifold 48. The converter 70 can include multiple catalyst bricks, in one example. In another example, multiple emission control devices, each with multiple bricks, can be used. The converter may be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 may receive various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a knock sensor for determining ignition of end gases (not shown); a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into cylinder 30 via intake manifold 44, and piston 36 moves to the bottom of the cylinder so as to increase the volume within cylinder 30. The position at which piston 36 is near the bottom of the cylinder and at the end of its stroke (e.g. when cylinder 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within cylinder 30. The point at which piston 36 is at the end of its stroke and closest to the cylinder head (e.g. when cylinder 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition devices such as spark plug 92, resulting in combustion. Additionally or alternatively compression may be used to ignite the air/fuel mixture. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

FIG. 2 shows an example schematic depiction of the engine 10, shown in FIG. 1. The engine 10 includes the piston 36 and the cylinder 30. The engine 10 further includes 3 additional cylinders and corresponding pistons. Therefore, the engine 10 includes 4 pistons and 4 cylinders in total. However, in other examples the number of cylinders in the engine may be altered. The piston 36 and the cylinder 30 may be referred to as the first piston and the first cylinder. A second piston 200, third piston 202, and fourth piston 204 are also shown. The second piston 200 is positioned within a second cylinder 206, the third piston 202 is positioned within a third cylinder 208, and the fourth piston 204 is positioned within a fourth cylinder 210.

The cylinders (30, 206, 208, and 210) are in an inline configuration. That is to say that a flat plane extends through the central axes 212 of all of the cylinders. When the cylinders are aligned in this way, the first and fourth cylinder (30 and 210, respectively) may be referred to as outer cylinders and the second and third cylinders (206 and 208, respectively) may be referred to as inner cylinders. Furthermore, the engine 10 may be referred to as an inline four cylinder engine when the cylinders are positioned in this way.

Each of the pistons is coupled to the crankshaft 40 via a piston rod, denoted via arrows 214. In this way, energy generated in the cylinders may be rotationally transferred to the crankshaft. The piston rods are coupled to crankshaft journal pins in the crankshaft 40, discussed in greater detail herein.

The crankshaft 40 is generically depicted via a rectangle. However, it will be appreciated that the crankshaft has additional complexity that is shown in FIGS. 3-14 and discussed in greater detail herein. The crankshaft 40 includes a front end 220 and rear end 222. A flywheel 224 may be coupled to the rear end 222. The rear end 222 may also be coupled to a transmission 226. Arrow 227 indicates the coupling of the rear end 222 to the transmission 226. The transmission 226 may be a manual transmission, an automatic transmission, a continuously variable transmission, etc.

FIG. 2 also shows 3 crankshaft bearings 230 in mechanical communication with crankshaft 40. Each of the bearings 230 may include an inner race in face sharing contact with a main bearing journal included in the crankshaft 40, discussed in greater detail herein with regard to FIGS. 3-14. The bearings 230 may also each include an outer race mechanically coupled to a cylinder block (shown in FIG. 15). The bearings 230 are configured to enable rotation of the crankshaft 40 while providing support to the crankshaft. In the depicted example the engine 10 includes a total of 3 crankshaft bearings. This number of bearings may be used to reduce the friction losses while the engine is in operation and the crankshaft is rotating. Reducing the friction losses may also improve the lugging limit in the engine. Operation of the engine may include a period of time when combustion is performed in the engine and the energy generated during combustion is transferred to the crankshaft.

FIG. 3 shows a first example of the crankshaft 40. The crankshaft 40, shown in FIG. 3, includes the front end 220 and the rear end 222, as discussed above with regard to FIG. 2. The crankshaft 40 includes a first journal pin 300, a second journal pin 302, a third journal pin 304, and a fourth journal pin 306. Therefore, the crankshaft includes a total of four journal pins. However, crankshafts having an alternate number of journal pins have been contemplated. The first journal pin 300 and the fourth journal pin 306 are arranged at similar radial positions with regard to rotational axis 350. Likewise, the second journal pin 302 and the third journal pin 304 are arranged at similar radial positions with regard to rotational axis 350. The journal pin arrangement of FIG. 3 supports an engine firing order of 1-3-4-2. However, other journal pin positions have been contemplated. As previously discussed, the journal pins (300, 302, 304, and 306) may be mechanically coupled to the piston rods 214, shown in FIG. 2. It will be appreciated that during operation, the crankshaft 40 rotates around rotational axis 350.

The crankshaft 40 further includes a first outer main bearing journal 308, an inner main bearing journal 310, and a second outer main bearing journal 312. The inner main bearing journal 310 is the sole inner main bearing journal in the depicted example. However, other bearing journal configurations have been contemplated. The inner main bearing journal 310 is positioned between the first outer main bearing journal 308 and the second outer main bearing journal 312. In the depicted example, the crankshaft 40 includes a total of 3 main bearing journals (308, 310, and 312). In this way, the crankshaft 40 has a decreased number of bearings when compared to prior art crankshafts which include at least 5 main bearing journals. As a result, friction in the drivetrain may be reduced, thereby increasing the power output of the engine. Each of the main bearing journals may be in mechanical communication with the crankshaft bearings 230, shown in FIG. 2. Specifically, an outer-surface of each main bearing journal may be in mechanical communication with (e.g., in face sharing and/or direct contact with) an inner race of a crankshaft bearing.

The crankshaft 40 further includes a first unsupported axially-aligned shaft section 314 and a second unsupported axially-aligned shaft section 316. The first unsupported axially-aligned shaft section 314 is positioned between the first outer main bearing journal 308 and the inner main bearing journal 310. Likewise, the second unsupported axially-aligned shaft section 316 is positioned between the second outer main bearing journal 312 and the inner main bearing journal 310. The first and second unsupported axially aligned shaft sections enable the decoupling of portions of the crankshaft 40 from the crankcase. In this way, the first and second unsupported axially aligned shaft sections (314 and 316) are not supported and their movement is not directly guided by bearings coupled thereto. The first and second unsupported axially aligned shaft sections (314 and 316) may be spaced equidistantly from the inner main bearing journal 310. Furthermore, the first and second unsupported axially-aligned shaft sections (314 and 316) are not directly coupled to a crankshaft bearing or other components external to the crankshaft. It will be appreciated that directly coupled means that there are no intermediary components positioned therebetween.

The crankshaft 40 further includes a first blade 318, a second blade 320, a third blade 322, and a fourth blade 324. As shown, the blades have a constant axial thickness. However, other blade thicknesses and geometries have been contemplated. For example, the blades may be tapered in a radial direction. The axial thickness may be measured along the rotational axis 350. Furthermore, the first and second blades 318 and 320 extend in opposing radial directions. Additionally, the third and fourth blades (322 and 324) extend in opposing radial directions. The first blade 318 and the second blade 320 are coupled to the first unsupported axially-aligned shaft section 314. The third blade 322 and the fourth blade 324 are coupled to the second unsupported axially-aligned shaft section 316. The blades are configured to balance the rotational mass in the crankshaft 40, thereby reducing the vibration of the crankshaft during rotation. The blades enable the rotational mass to be balanced in the crankshaft 40. However, it will be appreciated that additional counterweights may be used to dampen oscillations in the crankshaft 40. Therefore, additional mass balancing components may be included in the crankshaft 40 such as the pendulous counterweights (400 and 402) shown in FIG. 4 and discussed in greater detail herein.

A first pin counterweight 326, second pin counterweight 328, and third pin counterweight 330 are also shown in FIG. 3. The first pin counterweight 326 includes only a single balancing mass 332. Likewise, the third pin counterweight 330 only includes a single balancing mass 334. However, other pin counterweight configurations have been contemplated. For example, the first and third pin counterweights may include a plurality of balancing masses. The balancing mass 332 is positioned directly adjacent to the first outer main bearing journal 308.

Additionally, the balancing mass 332 is positioned on an outer-side of the first outer first journal pin 300. Furthermore, the balancing mass 334 is positioned directly adjacent the second outer main bearing journal 312. The second pin counterweight 328 includes two masses 336 positioned on opposing axial sides of the inner main bearing journal 310. Additionally, the two masses 336 have a similar radial position. Furthermore, each of the masses in the pin counterweights (326, 328, and 330) is identical in geometry and size. However, in other examples the masses included in the pin counterweights may vary in size and/or geometry. The pin counterweights are configured to counterbalance the journal pins on the crankshaft 40. In this way, vibration during crankshaft operation may be reduced. As a result, noise vibration, and harshness (NVH) in the engine may be reduced. It will be appreciated, that the crankshaft 40 shown in FIG. 3 may further comprise webs 338 coupling the journal pins to the unsupported axially-aligned shaft sections (314 and 316) and the main bearing journals (308, 310, and 312).

FIG. 4 shows the crankshaft 40 including additional mass balancing components. As shown in FIG. 4, the crankshaft 40 further includes a first pendulous counterweight 400, a second pendulous counterweight 402, a third pendulous counterweight 404, and a fourth pendulous counterweight 406. As shown, each counterweight is directly mechanically coupled to a blade. However, in other examples there may be an intermediary component positioned between the blades and the pendulous counterweights. The first pendulous counterweight 400 is mechanically coupled to the first blade 318 shown in FIG. 3, the second pendulous counterweight 402 is mechanically coupled to the second blade 320 shown in FIG. 3, the third pendulous counterweight 404 is mechanically coupled to the third blade 322 shown in FIG. 3, and the fourth pendulous counterweight 406 is mechanically coupled to the fourth blade 324 shown in FIG. 3. The pendulous counterweights may be removably coupled to the blades. In this way, the crankshaft may be adapted for a variety of engines. For example, size and shape of the counterweights may be designed for different engines to attenuate desired frequencies while a single type of base crankshaft structure may be used for all of the engines, if desired. In this way, the crankshaft may be used in a variety of engines while reducing manufacturing costs.

Additionally, pendulous counterweights may comprise a material different from a material of the blades.

The first and second pendulous counterweights (400 and 402, respectively) may be referred to as a first pair of pendulous counterweights and the third and fourth pendulous counterweights (404 and 406, respectively) may be referred to as a second pair of pendulous counterweights. The first pair of pendulous counterweights (400 and 402) is mechanically coupled to the first unsupported axially-aligned shaft section 314. Likewise, the second pair of pendulous counterweights (404 and 406) is mechanically coupled to the second unsupported axially-aligned shaft section 316. The rotational axis 350 of the crankshaft 40 is provided for reference. Furthermore, the first pendulous counterweight 400 extends in an opposing direction from the second pendulous counterweight 402.

The first blade 318, the second blade 320, the first pendulous counterweight 400, and the second pendulous counterweight 402 are included in a first pendulum absorber 410. Likewise, the third blade 322, the fourth blade 324, the third pendulous counterweight 404, and the fourth pendulous counterweight 406 are included in a second pendulum absorber 412. Thus, the first pendulum absorber 410 may comprise the first blade 318, the second blade 320, the first pendulous counterweight 400, and the second pendulous counterweight 402. Additionally, the second pendulum absorber may comprise the third blade 322, the fourth blade 324, the third pendulous counterweight 404, and the fourth pendulous counterweight 406. Each of the pendulum absorbers are positioned between an inner journal pin and an outer journal pin. The pendulum absorbers may be referred to as internal pendulum absorbers. The pendulum absorbers (410 and 412) are configured to attenuate vibration in the crankshaft 40. Specifically, the first pendulum absorber 410 may be configured to attenuate the vibration in the crankshaft 40 caused by the first journal pin 300 and the second journal pin 302. Likewise, the second pendulum absorber 412 may be configured to attenuate the vibration in the crankshaft 40 caused by the third journal pin 304 and the fourth journal pin 306. In this way, noise, vibration, and harshness (NVH) in the crankshaft may be reduced. The pendulum absorbers may also increase the stiffness of the crankshaft reducing bending in the crankshaft, thereby increasing the efficiency of the crankshaft during rotation and reducing vibration. Stiffening the crankshaft may also reduce the likelihood of crankshaft degradation. The pendulum absorbers also provide additional unloading of main bearing inertia forces.

As shown, the first pendulum absorber 410 is directly coupled to the first unsupported axially-aligned shaft section 314 and the second pendulum absorber 412 is directly coupled to the second unsupported axially-aligned shaft section 316. However, in other examples intermediary components may be positioned between the pendulum absorbers and the unsupported axially-aligned shaft sections.

FIG. 5 shows a side view of the crankshaft 40, shown in FIG. 3. As shown, the first pendulum absorber 410 extends from and is directly coupled to an outer surface 500 of the first unsupported axially-aligned shaft section 314. Likewise, the second pendulum absorber 412 extends from and is directly coupled to an outer surface 502 of the second unsupported axially-aligned shaft section 316. The outer surfaces (500 and 502) have a uniform radial curvature. Specifically, the outer surface has a round cross-section. However, other surface contours have been contemplated. Additionally, the first pendulous counterweight 400 and the second pendulous counterweight 402 fully traverse the outer surface 500 in an axial direction. The rotational axis 350 of the crankshaft 40 is provided for reference. However, in other examples, the first and second pendulous counterweights may only partially axially traverse the outer surface 500. It will be appreciated, that the pendulous counterweights may axially traverse the outer surface 500 due to the decoupling of the unsupported axially-aligned shaft section from the crankcase. When the pendulous counterweights are positioned in this way a greater amount of dampening of vibrations in the crankshaft may be achieved.

Likewise, the third pendulous counterweight 404 and the fourth pendulous counterweight 406 axially traverse the outer surface 502. The cutting planes for FIGS. 6-13 are also shown in FIG. 5. The arrows indicate the viewing direction for cross-section of the cutting plane. Furthermore, the third pendulous counterweight 404 and the fourth pendulous counterweight 406 are axially offset on a rotational axis of the crankshaft in the depicted example. However, other pendulous counterweight positions have been contemplated.

Figure 6:
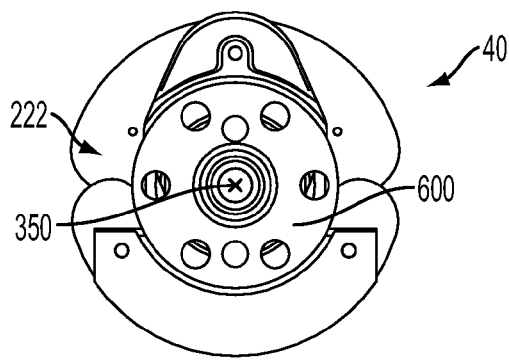
FIG. 6 shows the rear end of the crankshaft shown in FIG. 4.

FIG. 6 shows a view of the rear end 222 of the crankshaft 40. As shown, the rear end 222 includes a flywheel attachment flange 600. The flywheel 224, shown in FIG. 2, may be coupled to the attachment flange 600 via bolts, screws, and/or other suitable attachment apparatuses. The rotational axis 350 of the crankshaft is shown.

Figure 7:
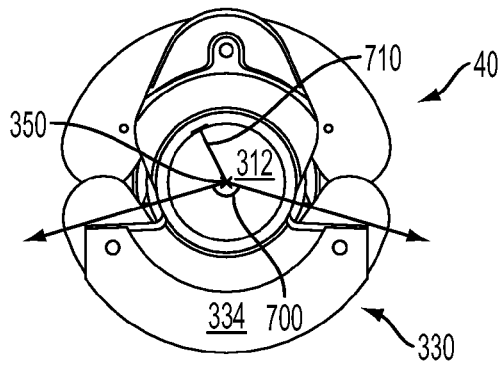

FIG. 7 shows a cross-sectional view of the crankshaft 40. The balancing mass 334 included in the third pin counterweight 330 is depicted. As shown, the balancing mass 334 extends in a radial direction. The radial divergence is indicated via angle 700. The second outer main bearing journal 312 and a radius 710 of the second outer main bearing journal 312 are shown in FIG. 7. It will be appreciated that the radius 710 of the second outer main bearing journal 312 may be substantially equivalent to the radii of the inner main bearing journal 310 and the first outer main bearing journal 308.

Figure 8:
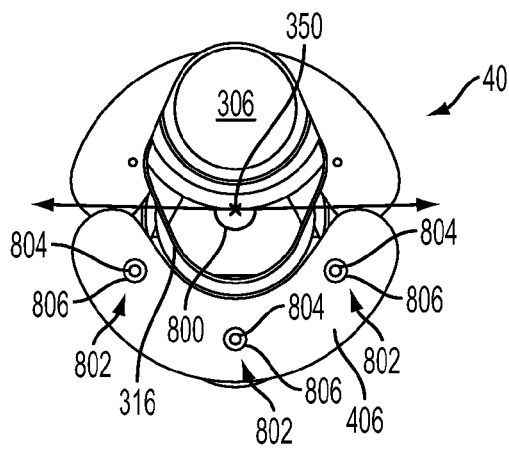

FIG. 8 shows another cross-sectional view of the crankshaft 40. The fourth pendulous counterweight 406 is shown in FIG. 8. As shown, the fourth pendulous counterweight 406 radially extends around the second unsupported axially-aligned shaft section 316 by greater than 120 degrees with regard to the rotational axis 350 of the crankshaft. The radial divergence is indicated via angle 800. However, other angles have been contemplated. Additionally, the fourth pendulous counterweight 406 is symmetric about an axis. However, other geometries have been contemplated.

As previously discussed the fourth pendulous counterweight 406 may be removably coupled to the fourth blade 324, shown in FIG. 3. Attachment apparatuses 802 may be used to achieve the aforementioned blade to counterweight attachment. The attachment apparatuses may include pins 804 and bushings 806. It will be appreciated that the first pendulous counterweight 400 and the fourth pendulous counterweight 406 have a similar size, geometry, and radial position. The fourth pendulous counterweight 406 is radially aligned with the third journal pin 304, shown in FIG. 10. That is to say, that a center of the fourth pendulous counterweight is at the same radial position as a center of third journal pin. The radial position is measured from the rotational axis 350.

Figure 9:
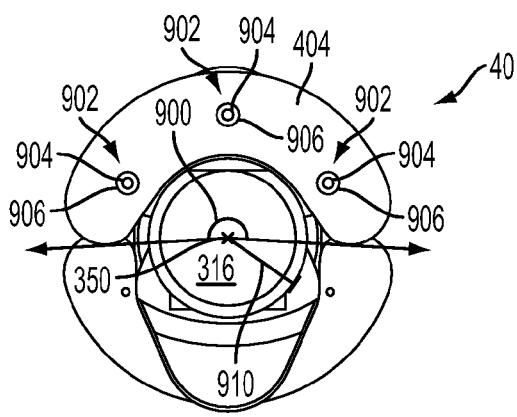
FIG. 7-13 show cross-sectional views of the crankshaft shown in FIG. 4.

FIG. 9 shows another cross-sectional view of the crankshaft 40. The third pendulous counterweight 404 is shown in FIG. 9. The third pendulous counterweight 404 radially extends around the second unsupported axially-aligned shaft section 316 by greater than 120 degrees with regard to the rotational axis 350 of the crankshaft. The radial divergence is indicated via angle 900. However, other angles have been contemplated. It will be appreciated that the central axis of the second unsupported axially-aligned shaft section 316 is the rotational axis 350. Likewise the central axis of the first unsupported axially-aligned shaft section 314 is the rotational axis 350. Thus, the central axes of the unsupported axially-aligned shafts and the rotational axis of the crankshaft are aligned. Additionally, the radius 910 of the second unsupported axially-aligned shaft section 316 may be greater than the radius 710 of the second outer main bearing journal 312, shown in FIG. 7. It will be appreciated that the radius of the first unsupported axially-aligned shaft section 314, shown in FIG. 3 may be substantially equivalent to the radius 910 of the second unsupported axially-aligned shaft section 316.

The third pendulous counterweight 404 may also be removably coupled to the third blade 322, shown in FIG. 3. Attachment apparatuses 902 may be used attach the third blade 320 to the third pendulous counterweight 404. The attachment apparatuses may include pins 904 and bushings 906. It will be appreciated that the second pendulous counterweight 402 and the third pendulous counterweight 404 have a similar size, geometry, and radial position. Additionally, the third pendulous counterweight 404 is radially aligned with the fourth journal pin 306, shown in FIG. 8. That is to say, that a center of the third pendulous counterweight is at the same radial position as a center of the fourth journal pin. The radial position is measured from the rotational axis 350.

Figure 10:
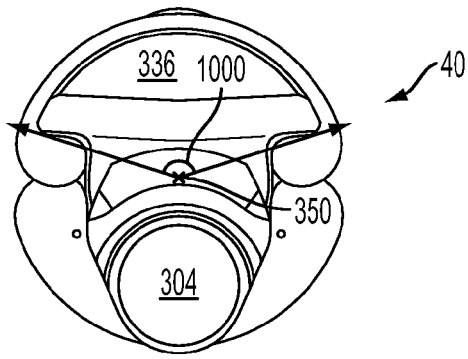

FIG. 10 shows another cross-sectional view of the crankshaft 40. The third journal pin 304 is shown in FIG. 10. Additionally, one of the masses 336 included in the second pin counterweight 328 is shown. The angle 1000 of radial divergence of the mass 336 with regard to the rotational axis 350 is also shown. As shown, the third journal pin 304 is radially separated from the fourth journal pin 306, shown in FIG. 8, by 180 degrees. However, other relative positions have been contemplated.

Figure 11:
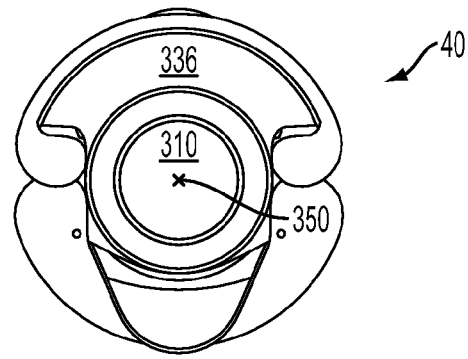

FIG. 11 shows another cross-sectional view of the crankshaft 40. The inner main bearing journal 310 is illustrated in FIG. 11. The rotational axis 350 and one of the two masses 336 is also shown. It will be appreciated that the two masses 336 have a substantially identical size, geometry, and radial position in the depicted example.

Figure 12:
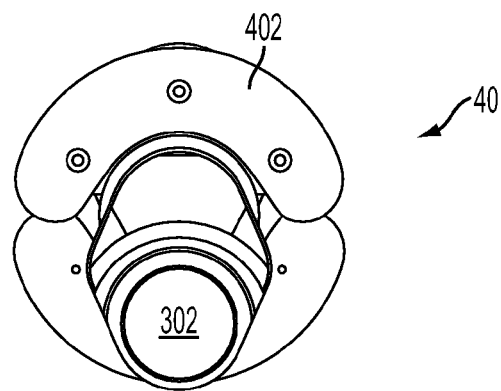

FIG. 12 shows another cross-sectional view of the crankshaft 40. The second journal pin 302 is shown in FIG. 12. The second pendulous counterweight 402 is shown in FIG. 12. As previously discussed, the second pendulous counterweight 402 and the fourth pendulous counterweight 406 have substantially identical sizes, geometries, and radial positions.

Figure 13:
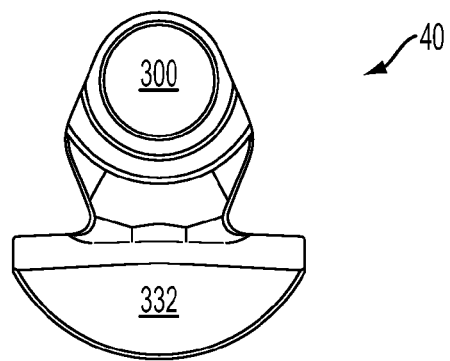

FIG. 13 shows another cross-sectional view of the crankshaft 40. The first journal pin 300 and the mass 332 are shown in FIG. 13. It will be appreciated that the mass 332 and mass 334 may have a substantially identical size, geometry, and radial position. FIG. 14 shows another cross-sectional view of the crankshaft 40. Specifically, FIG. 14 shows the front end 220 of the crankshaft 40.

Referring now to FIG. 15, it shows a plan view of an example cylinder block that supports the crankshaft of FIGS. 1-14. Cylinder block 1500 includes cylinders 36, 200, 202, and 204. The cylinder block 1500 may be included in the engine 10 shown in FIGS. 1 and 2. Cylinder block 1500 also includes three main bearing saddles 1502, 1504, and 1506. Crankshaft bearings 230 shown in FIG. 2 are pressed into main bearing saddles 1502, 1504, and 1506. Each main bearing is supplied with lubricating oil via oil ports 1510. Thus, a total of three main bearing saddles are provided for a four cylinder engine. A similar cylinder block configuration may be provided for an engine including additional cylinders such as an engine comprising eight cylinders, for example.

FIGS. 1-15 provide for a crankshaft comprising an unsupported axially-aligned shaft section positioned between an outer main bearing journal and an inner main bearing journal, the unsupported axially-aligned shaft section having a central axis aligned with a rotational axis of the crankshaft and a pendulum absorber coupled to the unsupported axially-aligned shaft section, the pendulum absorber comprising a blade extending from the unsupported axially-aligned shaft section and a pendulous counterweight coupled to the blade.

FIGS. 1-15 further provide for a crankshaft where the pendulous counterweight is removably coupled to the unsupported axially-aligned shaft section via an attachment apparatus. FIGS. 1-15 further provide for a crankshaft where the attachment apparatus include pins and bushings. FIGS. 1-15 further provide for a crankshaft where the crankshaft further comprises four journal pins, each of the four journal pins directly coupled to one of four piston rods. FIGS. 1-15 further provide for a crankshaft where the four piston rods are coupled to pistons positioned within cylinders, the cylinders arranged in an inline configuration where a flat plane extends through a central axis of the cylinders.

FIGS. 1-15 further provide for a crankshaft where the pendulous counterweight is symmetric about an axis. FIGS. 1-15 further provide for a crankshaft where the pendulous counterweight radially extends around the unsupported axially-aligned shaft section by greater than 120 degrees with regard to the rotational axis of the crankshaft. FIGS. 1-15 further provide for a crankshaft where the pendulous counterweight comprises a material different from a material of the blade.

FIGS. 1-15 also provide for a crankshaft comprising a total of three main bearing journals mechanically coupled to four pins arranged in an inline configuration, an unsupported axially-aligned shaft section positioned between two of the three main bearing journals, the unsupported axially-aligned shaft section having a central axis aligned with a rotational axis of the crankshaft, and a pendulum absorber coupled to the unsupported axially-aligned shaft section, the pendulum absorber including a first blade and second blade extending from the unsupported axially-aligned shaft section, a first pendulous counterweight coupled to the first blade, and a second pendulous counterweight coupled to the second blade.

FIGS. 1-15 further provide for a crankshaft where the pendulous counterweights are axially offset on a rotational axis of the crankshaft. FIGS. 1-15 further provide for a crankshaft where the first and second pendulous counterweights have similar geometries. FIGS. 1-15 further provide for a crankshaft where the first and second blades extend in opposing radial directions. FIGS. 1-15 further provide for a crankshaft where the first and second blades extend from an outer surface of the unsupported axially-aligned shaft section, the outer surface having a uniform radial curvature. FIGS. 1-15 further provide for a crankshaft where the first pendulous counterweight is radially aligned with an outer journal pin, where the second pendulous counterweight is aligned with an inner journal pin, and where the inner and outer journal pins are each coupled to a separate piston rod. FIGS. 1-15 further provide for a crankshaft where the inner and outer journal pins are radially separated by 180 degrees.

FIGS. 1-15 also provide for a crankshaft comprising a total of two outer main bearing journals and an inner main bearing journal, an unsupported axially-aligned shaft section positioned between an outer main bearing journal and an inner main bearing journal, the unsupported axially-aligned shaft section including a central axis aligned with a rotational axis of the crankshaft, and a pendulum absorber coupled to the unsupported axially-aligned shaft section, the pendulum absorber including a first blade and a second blade extending from the unsupported axially-aligned shaft section, a first pendulous counterweight coupled to the first blade, and a second pendulous counterweight coupled to the second blade.

FIGS. 1-15 further provide for a crankshaft comprising two inner and two outer journal pins coupled to piston rods in an engine, the pistons rods being coupled to separate pistons positioned within cylinders, the cylinders arranged in an inline configuration in which a flat plane extends through an axis of each cylinder. FIGS. 1-15 further provide for a crankshaft where the pendulum absorber is positioned between an inner journal pin and an outer journal pin. FIGS. 1-15 further provide for a crankshaft where the first pendulous counterweight extends in an opposing direction from the second pendulous counterweight.

FIGS. 1-15 provide for an inline four cylinder engine, comprising a crankshaft including two outer main bearing journals and a sole inner main bearing journal axially positioned between the two outer main bearing journals.

FIGS. 1-15 also provide for an inline four cylinder engine comprising a first unsupported axially—aligned shaft section positioned between one of the two outer main bearing journals and the sole inner main bearing journal, the first unsupported axially-aligned shaft section including a central axis aligned with a rotational axis of the crankshaft. FIGS. 1-15 also provide for an inline four cylinder engine comprising a second unsupported axially-aligned shaft section positioned between another of the two outer main bearing journals and the sole inner main bearing journal, the second unsupported axially-aligned shaft section having a central axis aligned with a rotational axis of the crankshaft.

FIGS. 1-15 further provide for an inline four cylinder engine where a radius of the first unsupported axially-aligned shaft section is larger than a radius of the inner main bearing journal. FIGS. 1-15 further provide for an inline four cylinder engine where the radius of the first unsupported axially-aligned shaft section is equal to a radius of a second unsupported axially-aligned shaft section. FIGS. 1-15 further provide for an inline four cylinder engine where the radii of the two outer main bearing journals are each equal to the radii of the inner main bearing journal. FIGS. 1-15 also provide for an inline four cylinder engine comprising two blades directly coupled to the first unsupported axially-aligned shaft section.

FIGS. 1-15 also provide for an inline four cylinder engine comprising a total of four journal pins, including two outer journal pins and two inner journal pins. FIGS. 1-15 further provide for an inline four cylinder engine where the two outer journal pins are arranged at similar radial positions and where the two inner journal pins are arranged at similar radial positions, the radial positions measured from the rotational axis of the crankshaft. FIGS. 1-15 further provide for an inline four cylinder engine where the two inner and two outer journal pins are radially separated by 180 degrees. FIGS. 1-15 further provide for an inline four cylinder engine where each of the total of four journal pin is directly coupled to a different piston rod.

FIGS. 1-15 further provide for an inline four cylinder engine where first unsupported axially-aligned shaft section is not directly coupled to a bearing. FIGS. 1-15 also provide for an inline four cylinder engine, comprising a cylinder block including only three main bearing saddles, three main bearings positioned within the three main bearing saddles, and a crankshaft positioned within the three main bearings, the crankshaft including four journal pins coupled to piston rods, the pistons rods being coupled to separate pistons positioned within engine cylinders.

FIGS. 1-15 further provide for an inline four cylinder engine where the crankshaft includes a total of two outer main bearing journals and an inner main bearing journal, each of the total of two outer main bearing journals and the inner main bearing journal in mechanical communication with one of the three main bearings, and where each of the total of two main bearing journals and the inner main bearing journal are each in direct contact with an inner race of separate crankshaft bearings.

FIGS. 1-15 also provide for an inline four cylinder engine comprising a first pin counterweight including a single mass positioned on an outer-side of one of the four journal pins. FIGS. 1-15 also provide for an inline four cylinder engine comprising an unsupported axially-aligned shaft section positioned between a first outer main bearing journal and the inner main bearing journal, the unsupported axially-aligned shaft section having a central axis aligned with a rotational axis of the crankshaft. FIGS. 1-15 also provide for an inline four cylinder engine comprising two blades directly coupled to the unsupported axially-aligned shaft section, the two blades positioned on radially opposing sides of the first unsupported axially-aligned shaft section. FIGS. 1-15 further provide for an inline four cylinder engine where the three main bearing saddles include oil ports.

FIGS. 1-15 also provide for an inline four cylinder engine, comprising a crankshaft including four journal pins coupled to four piston rods in the inline four cylinder engine, the crankshaft including two outer main bearing journals and an inner main bearing journal, the crankshaft also including a first and second unsupported axially-aligned shaft section, the first and second unsupported axially-aligned shaft section axially positioned between one of the two outer main bearing journals and the inner main bearing journal, the first and second unsupported axially-aligned shaft sections each including a central axis aligned with a rotational axis of the crankshaft.

FIGS. 1-15 further provide for an inline four cylinder engine where the crankshaft includes two outer journal pins and two inner journal pins, the two outer journal pins are arranged at similar radial positions and the two inner journal pins are arranged at similar radial positions.

It will be appreciated that the configurations and routines disclosed herein are exemplary in nature, and that these specific examples are not to be considered in a limiting sense, because numerous variations are possible. For example, the above technology can be applied to other types inline engines, opposed engines, V type engines, etc. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An inline four-cylinder engine, comprising: a crankshaft including two outer main bearing journals, a sole inner main bearing journal axially positioned between the two outer main bearing journals, and four journal pins directly coupled to corresponding piston rods of the four-cylinder engine, two of the four journal pins positioned between one of the two outer main bearing journals and the sole inner main bearing journal; and a first unsupported axially-aligned shaft section positioned between one of the two outer main bearing journals and the sole inner main bearing journal, the first unsupported axially-aligned shaft section including a central axis aligned with a rotational axis of the crankshaft and wherein the first unsupported axially-aligned shaft section is further positioned between only two of the four journal pins.

2. The inline four-cylinder engine of claim 1, further comprising a second unsupported axially-aligned shaft section positioned between another of the two outer main bearing journals and the sole inner main bearing journal, the second unsupported axially-aligned shaft section having a central axis aligned with a rotational axis of the crankshaft and wherein the second unsupported axially aligned shaft section is further positioned between only two of the four journal pins.

3. The inline four-cylinder engine of claim 2, where a radius of the first unsupported axially-aligned shaft section is larger than a radius of the sole inner main bearing journal.

4. The inline four-cylinder engine of claim 3, where the radius of the first unsupported axially-aligned shaft section is equal to a radius of the second unsupported axially-aligned shaft section.

5. The inline four-cylinder engine of claim 4, where radii of the two outer main bearing journals are each equal to the radius of the sole inner main bearing journal.

6. The inline four-cylinder engine of claim 1, further comprising two blades directly coupled to the first unsupported axially-aligned shaft section.

7. The inline four-cylinder engine of claim 1, wherein the four journal pins include two outer journal pins and two inner journal pins, one of the two outer journal pins and one of the two inner journal pins positioned between only one of the two outer main bearing journals and only the sole inner main bearing journal.

8. The inline four-cylinder engine of claim 7, where the two outer journal pins are arranged at similar radial positions and where the two inner journal pins are arranged at similar radial positions, the radial positions measured from the rotational axis of the crankshaft.

9. The inline four-cylinder engine of claim 8, where the two inner and two outer journal pins are radially separated by 180 degrees.

10. The inline four-cylinder engine of claim 7, where each of the total of four journal pins is directly coupled to a different piston rod and wherein the first unsupported axially-aligned shaft section is positioned between only one of the two outer journal pins and only one of the two inner journal pins.

11. The inline four-cylinder engine of claim 1, where the first unsupported axially-aligned shaft section is not directly coupled to a bearing.

12. An inline four cylinder engine, comprising: a cylinder block including only three main bearing saddles; three main bearings positioned within the three main bearing saddles; and a crankshaft positioned within the three main bearings, the crankshaft including two outer main bearing journals, a sole inner main bearing journal axially positioned between the two outer main bearing journals, and four journal pins coupled to piston rods, the pistons rods being coupled to separate pistons positioned within engine cylinders, and two of the four journal pins positioned between one of the outer main bearing journals and the sole main bearing journal; and an unsupported axially-aligned shaft section positioned between one of the two outer main bearing journals and the sole inner main bearing journal included in the crankshaft, the unsupported axially-aligned shaft section having a central axis aligned with a rotational axis of the crankshaft.

13. The inline four cylinder engine of claim 12, wherein each of the two outer main bearing journals and the sole inner main bearing journal are in mechanical communication with one of the three main bearings, and where each of the two main bearing journals and the sole inner main bearing journal are each in direct contact with an inner race of separate crankshaft bearings.

14. The inline four cylinder engine of claim 12, further comprising a first pin counterweight including a single mass positioned on an outer-side of one of the four journal pins.

15. The inline four cylinder engine of claim 12, further comprising two blades directly coupled to the unsupported axially-aligned shaft section, the two blades positioned on radially opposing sides of the unsupported axially-aligned shaft section.

16. The inline four cylinder engine of claim 12, where the three main bearing saddles include oil ports.

17. An inline four cylinder engine, comprising:
a crankshaft including four journal pins coupled to four piston rods in the inline four cylinder engine, the crankshaft including two outer main bearing journals and an inner main bearing journal with substantially equivalent radii measured from a rotational axis of the crankshaft, the crankshaft also including a first and second unsupported axially-aligned shaft section, the first and second unsupported axially-aligned shaft section axially positioned between one of the two outer main bearing journals and the inner main bearing journal, the first and second unsupported axially-aligned shaft sections each including a central axis aligned with the rotational axis of the crankshaft, and two of the four journal pins positioned between the inner main bearing journal and one of the two outer main bearing journals, where the crankshaft includes two outer journal pins and two inner journal pins, the two outer journal pins are arranged at similar radial positions and the two inner journal pins are arranged at similar radial positions and where one of the two outer journal pins and one of the two inner journal pins are positioned between only the inner main bearing journal and only one of the two outer main bearing journals.

* * * * *